United States Patent
Feng et al.

(10) Patent No.: US 9,666,193 B2
(45) Date of Patent: May 30, 2017

(54) METHOD AND APPARATUS FOR DISPLAYING A SHARING PAGE ACCORDING TO A DETECTED VOICE SIGNAL, AND NON-TRANSITORY COMPUTER-READABLE STORAGE MEDIUM

(71) Applicant: TENCENT TECHNOLOGY (SHENZHEN) COMPANY LIMITED, Guangdong (CN)

(72) Inventors: Cheng Feng, Guangdong (CN); Bo Hu, Guangdong (CN); Tingyong Tang, Guangdong (CN); Renfang Liu, Guangdong (CN); Zhipei Wang, Guangdong (CN); Ruiyi Zhou, Guangdong (CN); Xi Wang, Guangdong (CN); Zhengkai Xie, Guangdong (CN); Bosen He, Guangdong (CN); Ying Huang, Guangdong (CN); Wei Li, Guangdong (CN); Kai Zhang, Guangdong (CN); Huijiao Yang, Guangdong (CN); Yulei Liu, Guangdong (CN)

(73) Assignee: TENCENT TECHNOLOGY (SHENZHEN) COMPANY LIMITED (CN)

( * ) Notice: Subject to any disclaimer, the term of this patent is extended or adjusted under 35 U.S.C. 154(b) by 279 days.

(21) Appl. No.: 14/329,410

(22) Filed: Jul. 11, 2014

(65) Prior Publication Data
US 2014/0324439 A1 Oct. 30, 2014

Related U.S. Application Data

(63) Continuation of application No. PCT/CN2013/087526, filed on Nov. 20, 2013.

(30) Foreign Application Priority Data

Mar. 20, 2013 (CN) .......................... 2013 1 0090087

(51) Int. Cl.
*G10L 17/26* (2013.01)
*G10L 17/22* (2013.01)
(Continued)

(52) U.S. Cl.
CPC ....... *G10L 17/22* (2013.01); *H04N 21/42203* (2013.01); *H04N 21/4394* (2013.01);
(Continued)

(58) Field of Classification Search
CPC ...................................................... G10L 17/26
(Continued)

(56) References Cited

U.S. PATENT DOCUMENTS 8,238,570 B2 * 8/2012 Johnson, Jr. ......... H04R 1/1041
381/311
8,435,167 B2 * 5/2013 Oohashi ................ A61M 21/02
600/27
(Continued)

FOREIGN PATENT DOCUMENTS

CN 201985993 A 9/2011
CN 102668391 A 9/2012

OTHER PUBLICATIONS

International Search Report and Written Opinion dated Feb. 27, 2014 in corresponding PCT Application No. PCT/CN2013/087526, 11 pages.

*Primary Examiner* — Michael N Opsasnick
(74) *Attorney, Agent, or Firm* — Hauptman Ham, LLP

(57) ABSTRACT

A content sharing method, apparatus and an electronic device, which belongs to a field of computer technology, are provided. The method includes: collecting a voice signal by
(Continued)

the microphone after current content is displayed; detecting whether the voice signal is a blowing signal; displaying a sharing page corresponding to the current content in the case that the voice signal is the blowing signal, the sharing page containing content to be shared; sharing the content to be shared in the sharing page. According to the present method, a sharing page is displayed directly to guide a user to complete content sharing upon detecting that the voice signal collected by the microphone is the blowing signal, thus avoiding inconvenience caused by multiple times of clicks of the user during content sharing and greatly reducing the time for sharing.

11 Claims, 3 Drawing Sheets

(51) Int. Cl.
| | | |
|---|---|---|
| | H04R 1/08 | (2006.01) |
| | H04N 21/422 | (2011.01) |
| | H04N 21/439 | (2011.01) |
| | H04N 21/4788 | (2011.01) |

(52) U.S. Cl.
CPC .......... *H04N 21/4788* (2013.01); *H04R 1/08* (2013.01); *G10L 17/26* (2013.01)

(58) Field of Classification Search
USPC .......................................... 704/233
See application file for complete search history.

(56) References Cited

U.S. PATENT DOCUMENTS

| | | | | |
|---|---|---|---|---|
| 8,880,495 B2 * | 11/2014 | Andri | ............... | G06F 17/30749 455/562.1 |
| 8,930,185 B2 * | 1/2015 | Fukuda | ............... | G10L 15/02 704/219 |
| 8,963,962 B2 * | 2/2015 | Ubillos | ............... | H04L 51/24 345/661 |
| 8,996,367 B2 * | 3/2015 | Namba | ............... | H04R 3/005 704/233 |
| 2007/0178952 A1 * | 8/2007 | Ehara | ............... | A63F 13/00 463/1 |
| 2009/0210224 A1 * | 8/2009 | Fukuda | ............... | G10L 15/02 704/233 |
| 2009/0296954 A1 * | 12/2009 | Hooley | ............... | F41H 13/0081 381/80 |
| 2011/0083108 A1 * | 4/2011 | Klein | ............... | G06F 3/0481 715/859 |
| 2011/0153323 A1 | 6/2011 | Kim et al. | | |
| 2012/0130711 A1 * | 5/2012 | Yamabe | ............... | G10L 25/78 704/231 |
| 2013/0120402 A1 * | 5/2013 | Adams | ............... | G06F 9/44 345/473 |

* cited by examiner

METHOD AND APPARATUS FOR DISPLAYING A SHARING PAGE ACCORDING TO A DETECTED VOICE SIGNAL, AND NON-TRANSITORY COMPUTER-READABLE STORAGE MEDIUM

PRIORITY DECLARATION

The present disclosure is a continuation of International Patent Application No. PCT/CN2013/087526, file on Nov. 20, 2013, which claims priority to Chinese Patent Application No. 201310090087.1, with a title of "CONTENT SHARING METHOD, APPARATUS AND ELECTRONIC DEVICE", filed on Mar. 20, 2013 in State Intellectual Property Office of China, the disclosures of which are herein incorporated by reference.

FIELD OF INVENTION

The present disclosure relates to a field of computer technology, and particularly, to a content sharing method, apparatus and an electronic device.

BACKGROUND

With a rapid development of Internet and wireless communication technologies, electronic devices have been widely used. A user may often wish to share some interesting contents with his or her contacts while communicating through electronic devices. To facilitate content sharing, many current applications may implement a function of content sharing. The "electronic device" referred to herein may include a mobile phone, a tablet computer and a digital camera etc., and the "application" referred to herein may include a browser, an electronic reader and an electronic albums etc.

In the prior art, a method for content sharing is provided, which includes the following steps. A user opens a page in an application, and when contents in the page need to be shared, the user clicks a bottom area of the application first, then a toolbar is displayed at the bottom area after a click signal is received by an electronic device; next, the user clicks a menu on the toolbar, and then a plurality of application buttons are displayed in the menu after a signal of the user clicking the menu is received by the electronic device; then, the user clicks a sharing button on the menu, and a sharing page corresponding to the page is displayed which guides the user to edit content to be shared in the sharing page, after a signal of the user clicking the sharing button is received by the electronic device; finally, the content to be shared in the sharing page is sent to a server to share the content by the server.

However, as the application has more and more functions, it carries more and more application buttons accordingly. Therefore the sharing button for implementing content sharing may be buried at a fairly deep level and take the user several clicks to find. Meanwhile, for each click of the user, the electronic device would pop up a toolbar, menu or sharing page correspondingly, and each pop-up takes up a certain time, which finally results in a longer time for sharing content.

SUMMARY

According to a first aspect of the present disclosure, a content sharing method applied to an electronic device containing a microphone is provided, the method comprising:

collecting a voice signal by the microphone after current content is displayed;
detecting whether the voice signal is a blowing signal;
displaying a sharing page corresponding to the current content in the case that the voice signal is a blowing signal, the sharing page containing content to be shared;
sharing the content to be shared in the sharing page.

According to a second aspect of the present disclosure, a content sharing apparatus applied to an electronic device containing a microphone is provided, the apparatus comprising:

a first collecting module, configured to collect a voice signal by the microphone after current content is displayed;
a first detecting module, configured to detect whether the voice signal is a blowing signal;
a displaying module, configured to display a sharing page corresponding to the current content in the case that the voice signal collected by the first collecting module is a blowing signal, the sharing page containing content to be shared;
a sharing module, configured to share the content to be shared in the sharing page.

According to a third aspect of the present disclosure, an electronic device is provided, which contains the content sharing apparatus provided in the second aspect.

According to a fourth aspect of the present disclosure, an application is provided, which contains the content sharing apparatus provided in the second aspect.

According to a fifth aspect of the present disclosure, a non-transitory computer-readable storage medium having instructions stored thereon, the instructions, when executed by one or more processors, cause the processors to perform a content sharing method provided in the first aspect.

As can be seen from the above solutions, according to the present disclosure, a sharing page is displayed directly to guide the user to complete content sharing upon detecting that the voice signal collected by the microphone is the blowing signal, thus avoiding inconvenience caused by multiple times of clicks of the user during content sharing and greatly reducing the time for sharing.

BRIEF DESCRIPTION OF THE DRAWINGS

In order to explain the technical solutions of the embodiments of the present disclosure more clearly, the drawings needed in the description of the embodiments will be briefly introduced. It is apparent that the drawings described below are only some embodiments of the present disclosure, and other drawings may be obtained from these drawings without any inventive effort for an ordinary person skilled in the art.

DETAILED DESCRIPTION

Objects, technical solutions and advantages of the present disclosure will become more clear from the detailed description given hereinafter with reference to the drawings and embodiments.

The "electronic device" described in this description includes, but not limited to, a mobile phone, a tablet computers and a digital camera, the "application" mentioned herein includes, but not limited to, a browser, an electronic reader and an electronic album.

The First Embodiment

Figure 1:
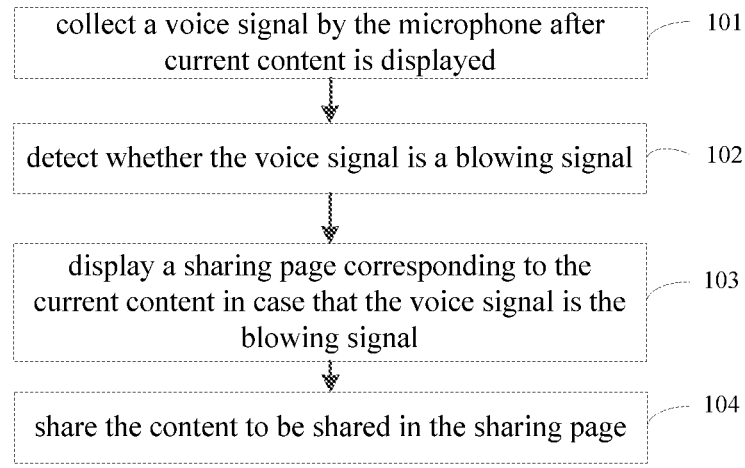
FIG. 1 is a method flow chart of a content sharing method according to a first embodiment of the present disclosure.

Referring to FIG. 1, a method flow chart of a content sharing method according to a first embodiment of the present disclosure is shown. The content sharing method may be applied to an electronic device containing a microphone, and the content sharing method may comprise the followings steps performed by the electronic device. It is understood that, according to specific Application Scenarios, the electronic device may be a single device or a plurality of devices separate from or combined with each other.

Step 101, a voice signal is collected by the microphone after current content is displayed.

The current content may be the page content displayed by an application. For example, the current content may be the webpage content displayed in a browser, the page content displayed in an electronic reader, and the page content displayed in an electronic album.

Step 102, it is detected whether the collected voice signal is a blowing signal.

A blowing signal is the signal generated when a user blows the microphone.

Step 103, a sharing page corresponding to the current content is displayed in the case that the collected voice signal is the blowing signal.

The sharing page may be generated according to the displayed current content. For example, when the current content is a webpage, the sharing page may include a URL, webpage content, an edit box provided for a user to edit contents therein, etc.

The sharing page may include content to be shared, which in general is the content that the user wishes to share with other users, i.e. information that may be seen or received by other users. For example, the content to be shared may include a URL, content in the edit box and webpage content, etc. In addition to the content to be shared, the sharing page also includes some contents only to be selected, clicked or viewed by the user, such as an "enter" button following the edit box, and such as, sharing options for users to select from, namely icons corresponding to the sharing options for selection.

Step 104, the content to be shared in the sharing page is shared.

To sum up, according to the content sharing method provided by the embodiment of the present disclosure, the sharing page is displayed directly to guide the user to complete content sharing upon detecting that the voice signal collected by the microphone is the blowing signal, thus avoiding inconvenience caused by multiple times of clicks of the user during content sharing and greatly reducing the time for sharing.

The Second Embodiment

Figure 2:
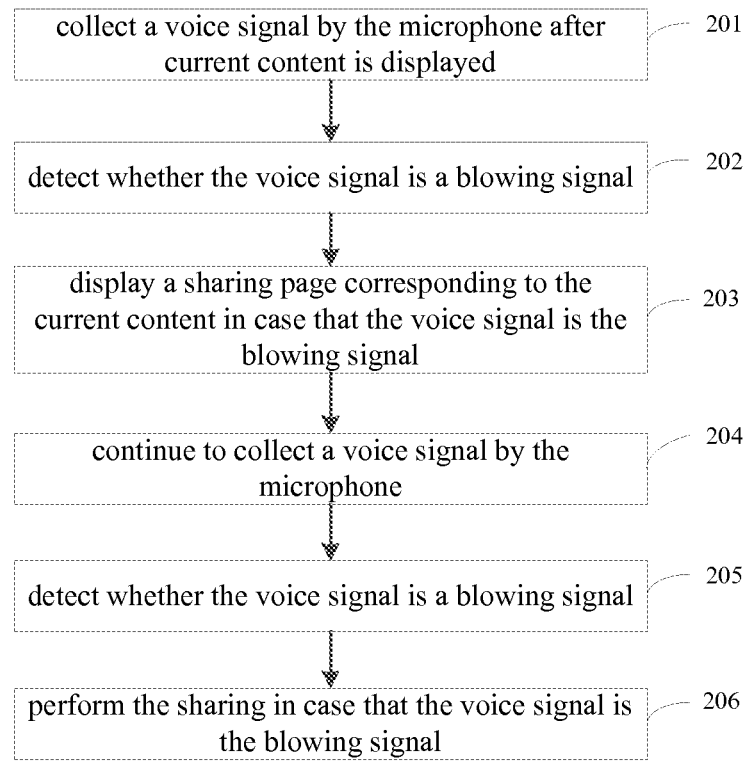
FIG. 2 is a method flow chart of a content sharing method according to a second embodiment of the present disclosure.

Referring to FIG. 2, a method flow chart of a content sharing method according to a second embodiment of the present disclosure is shown. The content sharing method may be applied to an electronic device containing a microphone, and the content sharing method may comprise the followings steps performed by the electronic device.

Step 201, a voice signal is collected by the microphone after current content is displayed.

The current content may be page content displayed on an application. For example, the current content may be the webpage content displayed in a browser, the page content displayed in an electronic reader, and the page content displayed in an electronic album.

When current content is displayed on the electronic device and a user wishes to share the current content, the user may blow the microphone in the electronic device, and correspondingly, the electronic device may collect a signal generated from blowing the microphone.

In practice, when a microphone is started up, it may receive any voice signals from the outside.

Step 202, it is detected whether the collected voice signal is a blowing signal.

A blowing signal is the signal generated when a user blows the microphone.

In general, the electronic device may collect voice signals within a pre-determined period of time, and determine whether a voice signal is a blowing signal based on frequency peak values of the voice signal.

In one embodiment, determining whether a voice signal is a blowing signal may comprise: detecting whether, within a first pre-determined period of time, the number of times that the frequency peak values of the voice signal reach a pre-determined peak value is larger than a first pre-determined threshold.

In another embodiment, determining whether a voice signal is a blowing signal may comprise: detecting whether, over a second pre-determined period of time, an average peak value of the frequency peak values of the voice signal is larger than a second pre-determined threshold.

It should be noted that, the above-mentioned first pre-determined period of time, second pre-determined period of time, first pre-determined threshold and second pre-determined threshold may be set freely. In the embodiment, the user may set the first pre-determined period of time, the second pre-determined period of time, the first pre-determined threshold and the second pre-determined threshold based on actual experience of usage in accordance with the user's own habit.

Step 203, a sharing page corresponding to the current content is displayed in the case that the collected voice signal is the blowing signal.

The sharing page may be generated according to the displayed current content. For example, the current content may be one or more of the following contents: a URL, content of the current webpage, brief content of the current webpage (such as headlines of news), content of the current page of an electronic novel, brief content of the current page of an electronic novel (such as the novel name or novel summary of the electronic novel), content of the current page of an electronic album, brief content of the current page of an electronic album (such as the name of the electronic album), edit box provided for the user to edit content, and sharing options, etc. For example, if the current content is a webpage, the sharing page may include contents such as a URL, webpage content or an edit box for users to edit content therein, and character selecting buttons for editing the content, etc.

Figure 3:
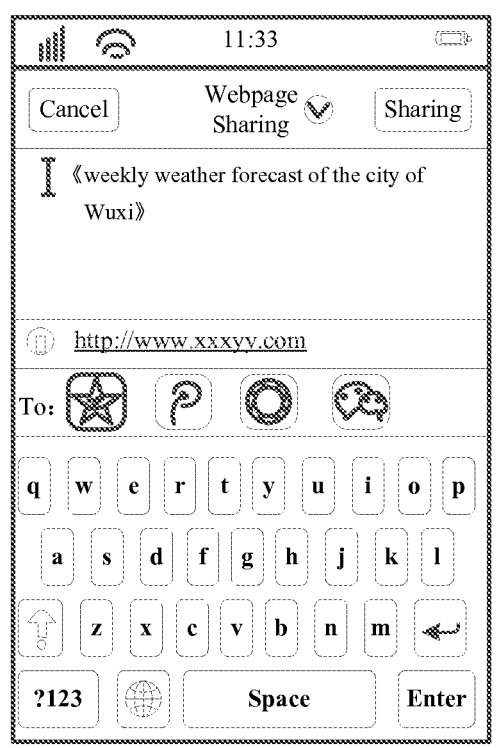
FIG. 3 is a schematic diagram of a sharing page according to an embodiment of the present disclosure.

In one embodiment, as shown in FIG. 3, a schematic diagram of a sharing page according to one embodiment of the present disclosure is illustrated. The sharing page of FIG. 3 includes contents such as a URL: http://www.xxxyy.com, a headline of news: <<weekly weather forecast of the city of Wuxi>>, an edit box for users to edit content therein, several sharing options (wechat(weixin), album and micro-blog (weibo) etc.), character selecting buttons etc.

The sharing page may include content to be shared, which in general is the content that the user wishes to share with other users, i.e. information that may be seen or received by other users. For example, the content to be shared may include a URL, content in the edit box and webpage content, etc. In addition to the content to be shared, the sharing page also includes some contents only to be selected, clicked or viewed by the user, such as an "enter" button following the edit box, and such as, sharing options for users to select from, namely icons corresponding to the sharing options for selection.

Generally, when a user uses the microphone to share the content, he or she might not know how much effort it needs to blow the microphone. If the user blows the microphone not strong enough, then the frequency peak values of the voice signal received by the microphone may be too small, which makes the voice signal received by the microphone can not be detected as a blowing signal. For example, the frequency peak values of the voice signals received by the microphone are substantially smaller than a pre-determined peak value, which makes the number of times that the frequency peak values of the voice signal reach a pre-determined peak value within a first pre-determined period of time smaller than a first threshold; or makes an average peak value of the frequency peak values of the voice signal received by the microphone over a second pre-determined period of time smaller than a second pre-determined threshold.

Therefore, for the purpose of improving a success rate of the user using microphone to share the content, the user need to be effectively guided to correctly and effectively blow the microphone.

In one embodiment, the sharing page corresponding to the current content may scroll from the side where the microphone located of the electronic device to the opposite side, and the time for the scrolling is in a negative correlation relationship with the number of times that the frequency peak values reach a pre-determined peak value and also in a negative correlation relationship with the average peak value. That is to say, when it is detected that the number of times that the frequency peak values of the voice signal reach the pre-determined peak value within the first pre-determined period of time is relatively small but larger than the first pre-determined threshold, or when it is detected that the average peak value of the frequency peak values of the voice signal is relatively small but larger than the second pre-determined threshold, the time spent for scrolling the sharing page will be relatively long.

On the contrary, when it is detected that the number of times that the frequency peak values of the voice signals reach the pre-determined peak value within the first pre-determined period of time is larger than the first pre-determined threshold and is relatively large, or when it is detected that the average peak value of the frequency peak values of the voice signal is larger than the second pre-determined threshold and is relatively large, the time spent for scrolling the sharing page will be relatively short. In this way, next time when the user uses the microphone for sharing, he or she would pay attention to increase or decrease the strength for blowing, and after several times, the user may figure out how much effort is needed to blow the microphone, and thus may effectively display the sharing page.

It should be noted that, the sharing page may also be displayed from any side of the electronic device to the opposite side in any way, such as scrolling, sliding, flying-in, flipping-in, etc. Correspondingly, the time for displaying in any way is in a negative correlation relationship with the above-mentioned number of times and the average peak value.

Step 204, the microphone continue to collect a voice signal.

Once the user finishes editing the displayed sharing page, he or she may continue to blow the microphone, so as to make the electronic device continue to collect voice signals received by the microphone. As an exemplary implementation, the electronic device may continue to collect the voice signal during a predefined time period after the user finishes editing the displayed sharing page, and the voice signal collected during this time period will subject to the following processes.

Step 205, it is detected whether the collected voice signal is a blowing signal.

A blowing signal is a voice signal generated when the user blows the microphone once again after finishing the edition to the sharing page.

In general, the electronic device may collect voice signals within a pre-determined period of time, and determine whether a voice signal is a blowing signal based on frequency peak values of the voice signal.

In one embodiment, determining whether a voice signal is a blowing signal may comprise: detecting whether, within a first pre-determined period of time, the number of times that the frequency peak values of the voice signal reach a pre-determined peak value is larger than a first pre-determined threshold.

In another embodiment, determining whether a voice signal is a blowing signal may comprise: detecting whether, over a second pre-determined period of time, an average peak value of the frequency peak values of the voice signal is larger than a second pre-determined threshold.

In one embodiment, testing standards in steps 202 and 205 for detecting whether the voice signal is the blowing signal may be the same, i.e. the first pre-determined period of time, the first pre-determined threshold, the second pre-determined period of time, and the second pre-determined threshold in step 202 may have the same values with those in step 205, respectively.

Certainly in other embodiments, the first pre-determined period of time, the first pre-determined threshold, the second pre-determined period of time, and the second pre-determined threshold in step 205 may have different values than those in step 202. For example, in step 202, the first pre-determined period of time may be 5 s, the first pre-determined threshold may be 20, the second pre-determined period of time may be 7 s and the second pre-determined threshold may be 300 kHz; while in step 205, the first pre-determined period of time may be 6 s, the first pre-determined threshold may be 25, the second pre-determined period of time may be 4 s and the second pre-determined threshold may be 270 kHz.

Step 206, the content to be shared in the sharing page will be shared in the case that the collected voice signal is the blowing signal.

In general, the sharing page may include a plurality of sharing options which may be categorized into two types: one type of sharing options uses a network application to share, the other type of sharing options uses a local application to share, the network applications may include various micro-blogs, forums, spaces corresponding to various chatting applications, while the local applications may include clients of various chatting applications and clients of electronic cameras installed in the electronic devices.

In practice, the network applications displayed on the sharing page have already authorized the application for providing the content to be shared. For example, in the case that a browser is the application for providing content to be shared, and micro-blog is the network application, if it is desired to share the content of a webpage in the browser to micro-blog, the micro-blog may authorize the browser in advance, i.e. a server corresponding to the micro-blog has already verified the micro-blog account and password information provided by the user, which allows the browser to share the content of the webpage via the authorized account of the micro-blog.

In should be noted that, if the network application corresponding to the selected sharing option has not yet authorized the application for providing the content to be shared, then the network application may first authorize the application for providing the content to be shared (such as a browser, an electronic album and an electronic browser etc.).

If the sharing option is the sharing is performed via a local application, such as via a client of the wechat or a client of other chatting applications installed locally on the electronic device, then the client of the local application in the electronic device needs to be invoked, in order to share the content to be shared in the sharing page. It should be noted that, the local application described herein must be authorized by a corresponding server at first, that is to say, after the local application has successfully logged in the electronic device locally in advance, the content to be shared in the sharing page can be shared.

Sharing the content to be shared in the sharing page may be: performing the sharing according to a default sharing option or a selected current sharing option, the selected current sharing option is a sharing option selected, by a touch operation or a push-button operation, from at least one sharing options provided in the sharing page.

In other words, after the sharing page is displayed, there will be a default sharing option on the sharing page, and if the user does not select other sharing options, then the content to be shared in the sharing page will generally be shared based on the default sharing option; while if the user selects a non-default sharing option from the plurality of other sharing options provided on the sharing page, then the content to be shared in the sharing page may be shared based on the selected current sharing option. In a specific operation, the user may select a sharing option provided on the sharing page by a touch operation or a push-button operation, and take the selected sharing option as the current sharing option.

In an embodiment, as shown in FIG. 3, the default sharing option maybe the micro-blog, and when the user does not want to share through the micro-blog, he or she may choose other sharing options displayed on the sharing page, such as wechat or space etc.

Based on different sharing options, sharing the content to be shared in the sharing page may include the following two scenarios:

First, when the sharing option is to share via a network application, and the network application has already authorized the application containing the sharing content, the electronic device first sends the content to be shared in the sharing page to a server corresponding to the network application according to the authorized account of the network application, in order that the server synchronize the content to be shared into the authorized accounts of the network application;

In a specific embodiment, if the current sharing option is to share via a network application (micro-blog), first, the user needs to make sure that the application for providing the content to be shared has already been authorized by the network application, and if the application is not authorized by the network application, the network application will first authorize the application for providing the content to be shared, and then the content to be shared may be shared via the authorized application.

Second, when the sharing option is to share via a local application, the electronic device first sends the content to be shared in the sharing page to the local application, the user selects a contact in the local application and sends content to be shared in the sharing page to the selected contact.

In a specific embodiment, if the current sharing option is to share via a certain chatting application, first, the user needs to make sure that he or she has logged in the chatting application in the electronic device, and if the user has not logged in, he or she shall log-in the chatting application firstly, then the user selects a contact in the logged-in chatting application and sends content to be shared in the sharing page to the selected contact.

It should be noted that, according to the descriptions in steps 204-206 of the above embodiment, after the sharing page corresponding to the current content is displayed on the electronic device, the electronic device will share the content to be shared directly when a blowing signal is detected again. However, when the sharing page corresponding to the current content is displayed on the electronic device, instead of performing steps 204-206, the user also may click a sharing button directly so as to generate sharing request information, and the electronic device will share the content to be shared in the sharing page according to a default sharing option upon receiving the sharing request information. Optionally, when a sharing page corresponding to the current content is displayed on the electronic device, the user may also first choose a non-default sharing option from a plurality of sharing options provided by the sharing page, that is to say, a sharing option request information is generated correspondingly when the user selects a sharing option, and the electronic device takes the sharing option selected by the user as the current sharing option upon receiving the sharing option request information. In this case, if the user clicks the sharing button to generate sharing request information, the electronic device will share the content to be shared in the sharing page based on the current sharing option upon receiving the sharing request information. The details of sharing content to be shared in the sharing page based on a default or a current sharing option are similar with the above descriptions, and will not be repeated herein.

To sum up, according to the content sharing method provided by the embodiment of the present disclosure, a sharing page is displayed directly to guide a user to complete the content sharing upon detecting that the voice signal collected by the microphone is the blowing signal, thus avoiding inconvenience caused by multiple times of clicks of the user during content sharing and greatly reducing the time for sharing.

The Third Embodiment

Figure 4:
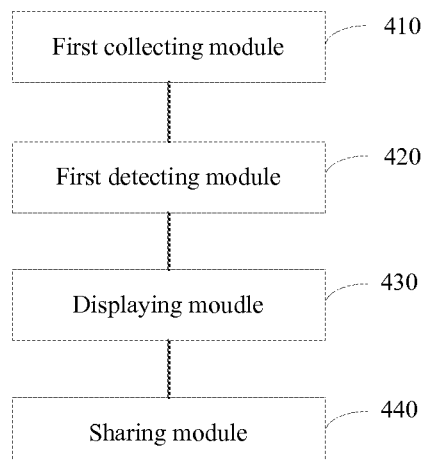
FIG. 4 is a schematic structural diagram of a content sharing apparatus according to a third embodiment of the present disclosure.

Referring to FIG. 4, a schematic structural diagram of a content sharing apparatus according to a third embodiment of the present disclosure is shown. The content sharing apparatus may be implemented as part of an electronic device containing a microphone, or implemented as part of an application. The application mentioned here is generally a program installed in an electronic device containing a microphone, such as a browser, an electronic reader and an electronic album, etc. The content sharing apparatus may comprise a first collecting module 410, a first detecting module 420, a displaying module 430 and a sharing module 440.

The first collecting module 410 may be configured to collect a voice signal by the microphone after current content is displayed.

The first detecting module 420 may be configured to detect whether the voice signal collected by the first collecting module 410 is a blowing signal.

In one embodiment, the first detecting module 420 may be configured to detect whether the voice signal collected by the first collecting module 410 is a blowing signal by detecting whether frequency peak values of the voice signal collected by the first collecting module 410 satisfy at least one of: a number of times that the frequency peak values reach a pre-determined peak value within a first pre-determined period of time is larger than a first pre-determined threshold; and an average peak value of frequency peak values within a second pre-determined period of time is larger than a second pre-determined threshold.

The displaying module 430 may be configured to display a sharing page corresponding to the current content when it is detected by the first detecting module 420 that the voice signal is the blowing signal, the sharing page containing content to be shared.

In one embodiment, the displaying module 430 may also be configured to: scrolling the sharing page corresponding to the current content from one side (such as the side that the microphone located) of the electronic device to the opposite side, and the time spend on the scrolling is in a negative correlation relationship with the number of times that the frequency peak values reach a pre-determined peak value and also in a negative correlation relationship with the average peak value.

The sharing module 440 may be configured to share the content to be shared in the sharing page displayed in the sharing displaying module 430.

Specifically, the sharing module 440 may be configured to share the content to be shared in the sharing page according to a default sharing option or a selected current sharing option in response to a clicking operation on, for example, a sharing button of the user. The selected current sharing option is a sharing option selected, by a touch operation or a push-button operation, from at least one sharing options provided in the sharing page.

To sum up, according to the content sharing apparatus provided by the embodiment of the present disclosure, a sharing page is displayed directly to guide a user to complete the content sharing upon detecting that the voice signal collected by the microphone is the blowing signal, thus avoiding inconvenience caused by multiple times of clicks of the user during content sharing and greatly reducing the time for sharing.

The Fourth Embodiment

Figure 5:
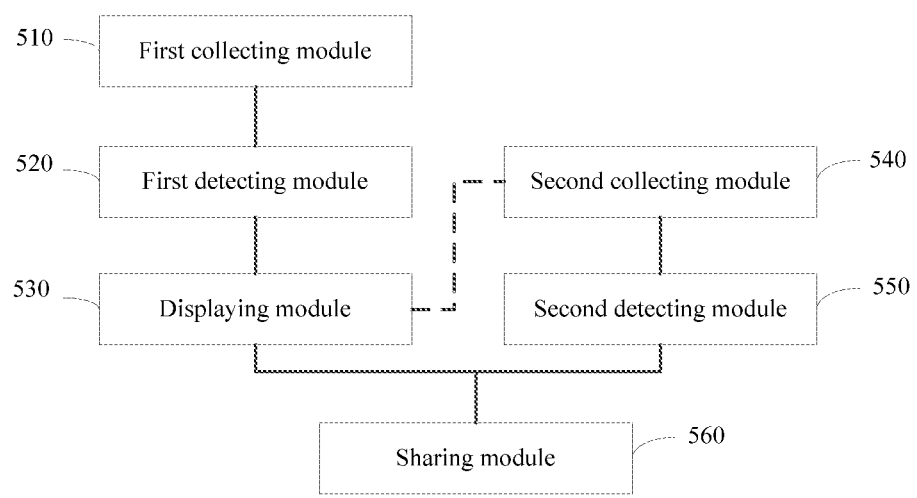
FIG. 5 is a schematic structural diagram of a content sharing apparatus according to a fourth embodiment of the present disclosure.

Referring to FIG. 5, a schematic structural diagram of a content sharing apparatus according to a fourth embodiment of the present disclosure is shown. The content sharing apparatus may be implemented as part of an electronic device containing a microphone, or implemented as part of an application. The application mentioned here is generally a program installed in an electronic device containing a microphone, such as a browser, an electronic reader and an electronic album, etc. The content sharing apparatus may comprise a first collecting module 510, a first detecting module 520, a displaying module 530, a second collecting module 540, a second detecting module 550 and a sharing module 560.

The first collecting module 510 may be configured to collect a voice signal by the microphone after current content is displayed.

The first detecting module 520 may be configured to detect whether the voice signal collected by the first collecting module 510 is a blowing signal.

In one embodiment, the first detecting module 520 may be configured to detect whether the voice signal collected by the first collecting module 510 is a blowing signal by detecting whether frequency peak values of the voice signal collected by the first collecting module 510 satisfy at least one of: a number of times that the frequency peak values reach a pre-determined peak value within a first pre-determined period of time is larger than a first pre-determined threshold; and an average peak value of frequency peak values within a second pre-determined period of time is larger than a second pre-determined threshold.

The displaying module 530 may be configured to display a sharing page corresponding to the current content when it is detected by the first detecting module 520 that the voice signal collected by the second collecting module 540 is the blowing signal, the sharing page containing content to be shared.

In one embodiment, the displaying module 530 may also be configured to: scrolling the sharing page corresponding to the current content from one side (such as the side that the microphone located) of the electronic device to the opposite side, and the time spend on the scrolling is in a negative correlation relationship with the number of times that the frequency peak values reach a pre-determined peak value and also in a negative correlation relationship with the average peak value.

The second collecting module 540 may be configured to continue to collect a voice signal by the microphone after the illustrated displaying module 530 displays the sharing page corresponding to the current content.

It should be noted that the dashed line shown in FIG. 5 is used to indicate that the second collecting module 540 continues to collect a voice signal by the microphone after the sharing page is displayed by the displaying module 530. That is to say, the collecting timing that the second collecting module 540 collects the voice signal is after the displaying timing that the displaying module 530 displays the sharing page. In addition, as an exemplary implementation, the second collecting module 540 may continue to collect the voice signal during a predefined time period after the sharing page is displayed by the displaying module 530.

The second detecting module 550 may be configured to detect whether the voice signal collected by the second collecting module 540 is a blowing signal.

The sharing module 560 may be configured to share the content to be shared in the sharing page displayed by the displaying module 530 upon detecting that the voice signal is the blowing signal by the second detecting module 550.

In one embodiment, the sharing module 560 may further be configured to share the content to be shared in the sharing page according to a default sharing option or a selected current sharing option. The selected current sharing option is a sharing option selected, by a touch operation or a push-button operation, from at least one sharing options provided in the sharing page.

To sum up, according to the content sharing apparatus provided by the embodiment of the present disclosure, a sharing page is displayed directly to guide a user to complete the content sharing upon detecting that the voice signal collected by the microphone is the blowing signal, thus avoiding inconvenience caused by multiple times of clicks of the user during content sharing and greatly reducing the time for sharing.

It should be noted that the content sharing apparatus provided in the above embodiment is illustrated by taking a division of respective functional modules as described above as an example. In a practical application, the above mentioned functions may be assigned to different function modules according to the requirements, i.e. the internal structure of the electronic device may be divided into different function modules to implement all or part of the above-mentioned functions. In addition, the content sharing apparatus and content sharing method according to the above embodiments belong to a same concept, the specific implementation of the content sharing apparatus is referred to the method embodiment, and unnecessary details thereof are no longer given herein.

The sequence numbers of the above embodiments of the disclosure are only for the purpose of description, and do not represent one embodiment is superior to another.

It is appreciated by those skilled in the art that all or part of steps for implementing the above embodiment may be achieved by hardware or by related hardware instructed by a program which may be stored in a computer-readable storage medium. The computer-readable storage medium may be a read only memory, a magnetic disk, an optical disk and the like. Specifically, the computer-readable storage medium may have instructions stored thereon, the instructions, when executed by one or more processors, cause the processors to perform operations comprising: collecting a voice signal by a microphone after current content is displayed; detecting whether the collected voice signal is a blowing signal; displaying a sharing page corresponding to the current content in the case that the collected voice signal is the blowing signal, the sharing page containing content to be shared; sharing the content to be shared in the sharing page.

The above descriptions are only embodiments of the present disclosure, and not for limiting the present disclosure. Any variation, equivalent substitution or modification as falls in the spirit and principle of the present disclosure are intended to be included within the scope of the present disclosure.

What is claimed is:

1. A content sharing method applied to an electronic device containing a microphone, the method comprising:
    collecting a voice signal by the microphone after current content is displayed;
    detecting whether the voice signal is a blowing signal;
    displaying directly a sharing page corresponding to the current content according to the displayed current content in the case that the voice signal is the blowing signal, the sharing page containing content to be shared; and
    sharing the content to be shared in the sharing page,
    wherein, displaying a sharing page corresponding to the current content comprises:
        scrolling the sharing page corresponding to the current content from one side of the electronic device to an opposite side, and time spent for scrolling the sharing page is in a negative correlation relationship with a number of times that frequency peak values of the voice signal reaching a pre-determined peak value within a first pre-determined period of time or an average peak value.

2. The method according to claim 1, wherein, detecting whether the voice signal is a blowing signal comprises detecting whether the frequency peak values of the voice signal satisfy at least one of:
    the number of times that the frequency peak values reach the pre-determined peak value within the first pre-determined period of time is larger than a first pre-determined threshold; or
    the average peak value of the frequency peak values within a second pre-determined period of time is larger than a second pre-determined threshold.

3. The method according to claim 1, wherein, sharing the content to be shared in the sharing page further comprises:
    continuing to collect a voice signal by the microphone;
    detecting whether the voice signal is a blowing signal;
    performing the sharing in the case that the voice signal is the blowing signal.

4. The method according to claim 3, wherein, sharing the content to be shared in the sharing page further comprises:
    performing the sharing according to a default sharing option or a selected current sharing option, the selected current sharing option is a sharing option selected, by a touch operation or a push-button operation, from at least one sharing options provided in the sharing page.

5. The method according to claim 1, wherein, sharing the content to be shared in the sharing page further comprises:
    performing the sharing according to a default sharing option or a selected current sharing option in response to a clicking operation, the selected current sharing option is a sharing option selected, by a touch operation or a push-button operation, from at least one sharing options provided in the sharing page.

6. A content sharing apparatus applied to an electronic device containing a microphone, the apparatus comprising:
    a first collecting module, configured to collect a voice signal by the microphone after current content is displayed;
    a first detecting module, configured to detect whether the voice signal collected by the first collecting module is a blowing signal;
    a displaying module, configured to display directly a sharing page corresponding to the current content according to the displayed current content in the case that the voice signal collected by the first collecting module is a blowing signal, the sharing page containing content to be shared; and
    a sharing module, configured to share the content to be shared in the sharing page,
    wherein, the displaying module is configured to:
        scroll the sharing page corresponding to the current content from one side of the electronic device to an opposite side, and time spent for scrolling the sharing page is in a negative correlation relationship with a number of times that frequency peak values of the voice signal reaching a pre-determined peak value within a first pre-determined period of time or an average peak value.

7. The apparatus according to claim 6, wherein, the first detecting module is configured to detect whether the frequency peak values of the voice signal collected by the first collecting module satisfy at least one of:

the number of times that the frequency peak values reach the pre-determined peak value within the first pre-determined period of time is larger than a first pre-determined threshold; or the average peak value of the frequency peak values within a second pre-determined period of time is larger than a second pre-determined threshold.

8. The apparatus according to claim 6, further comprising:

a second collection module, configured to continue to collect a voice signal by the microphone after the displaying module displays the sharing page corresponding to the current content;

a second detecting module, configured to detect whether the voice signal collected by the second collecting module is a blowing signal;

wherein the sharing module is further configured to share the content to be shared in the sharing page in the case that the voice signal collected by the second collecting module is the blowing signal.

9. The apparatus according to claim 8, wherein, the sharing module is further configured to:

share the content to be shared in the sharing page according to a default sharing option or a selected current sharing option, the selected current sharing option is a sharing option selected, by a touch operation or a push-button operation, from at least one sharing options provided in the sharing page.

10. The apparatus according to claim 6, wherein, the sharing module is further configured to:

share the content to be shared in the sharing page according to a default sharing option or a selected current sharing option in response to a clicking operation, the selected current sharing option is a sharing option selected, by a touch operation or a push-button operation, from at least one sharing options provided in the sharing page.

11. A non-transitory computer-readable storage medium having instructions stored thereon, the instructions, when executed by one or more processors, cause the processors to perform operations comprising:

collecting a voice signal by a microphone after current content is displayed;

detecting whether the voice signal is a blowing signal;

displaying a sharing page corresponding to the current content in the case that the voice signal is the blowing signal, the sharing page containing content to be shared;

sharing the content to be shared in the sharing page, wherein, displaying a sharing page corresponding to the current content comprises:

scrolling the sharing page corresponding to the current content from one side of the electronic device to an opposite side, and time spent for scrolling the sharing page is in a negative correlation relationship with a number of times that frequency peak values of the voice signal reaching a pre-determined peak value within a first pre-determined period of time or an average peak value.

* * * * *